United States Patent
Hafeman

(10) Patent No.: US 9,021,610 B2
(45) Date of Patent: *Apr. 28, 2015

(54) COMPUTER RECOVERY OR RETURN

(71) Applicant: Carolyn W. Hafeman, Evergreen, CO (US)

(72) Inventor: Carolyn W. Hafeman, Evergreen, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/087,866

(22) Filed: Nov. 22, 2013

(65) Prior Publication Data

US 2014/0082722 A1  Mar. 20, 2014

Related U.S. Application Data

(63) Continuation of application No. 10/945,332, filed on Sep. 20, 2004, now Pat. No. 8,601,606, which is a continuation-in-part of application No. 10/304,827, filed on Nov. 25, 2002, now abandoned.

(51) Int. Cl.
| | |
|---|---|
| *H04L 29/06* | (2006.01) |
| *H04L 9/32* | (2006.01) |
| *G06F 21/31* | (2013.01) |
| *G06F 21/88* | (2013.01) |

(52) U.S. Cl.
CPC ............... *G06F 21/31* (2013.01); *G06F 21/88* (2013.01)

(58) Field of Classification Search
None
See application file for complete search history.

(56) References Cited

U.S. PATENT DOCUMENTS

| | | | | |
|---|---|---|---|---|
| 5,715,174 | A * | 2/1998 | Cotichini et al. | 709/229 |
| 5,748,084 | A * | 5/1998 | Isikoff | 340/568.1 |
| 5,764,892 | A * | 6/1998 | Cain et al. | 709/200 |
| 5,802,280 | A * | 9/1998 | Cotichini et al. | 709/200 |
| 5,896,497 | A * | 4/1999 | Halstead | 726/35 |
| 5,987,609 | A * | 11/1999 | Hasebe | 726/35 |
| 6,087,937 | A * | 7/2000 | McCarthy | 340/567 |
| 6,244,758 | B1 * | 6/2001 | Solymar et al. | 709/224 |
| 6,269,392 | B1 * | 7/2001 | Cotichini et al. | 709/200 |
| 6,300,863 | B1 * | 10/2001 | Cotichini et al. | 340/5.8 |
| 6,300,946 | B1 * | 10/2001 | Lincke et al. | 715/700 |
| 6,507,914 | B1 * | 1/2003 | Cain et al. | 726/35 |
| 6,601,095 | B1 * | 7/2003 | Duffield et al. | 709/222 |
| 6,609,656 | B1 * | 8/2003 | Elledge | 235/382 |
| 6,662,023 | B1 * | 12/2003 | Helle | 455/558 |
| 6,725,379 | B1 * | 4/2004 | Dailey | 726/35 |
| 6,804,699 | B1 * | 10/2004 | Henrie | 709/203 |
| 6,832,320 | B1 * | 12/2004 | Broyles et al. | 726/18 |
| 7,818,557 | B2 * | 10/2010 | Bestmann | 713/2 |
| 7,818,803 | B2 * | 10/2010 | Gordon | 726/22 |

(Continued)

OTHER PUBLICATIONS

"2,001 tips: portables—whether you're on the road or back at home, here's how to get the most from your portable computer", Winter 1998, Windows Magazine, vol. 5, No. 2, p. 149-152.*

(Continued)

*Primary Examiner* — Christopher Revak
(74) *Attorney, Agent, or Firm* — Ansel M. Schwartz

(57) ABSTRACT

A computer return apparatus includes a processor. The apparatus includes a memory connected to the processor. The apparatus includes a display. The apparatus includes a return screen that the processor automatically causes to appear during or after boot-up of the processor on the display, that displays information concerning an owner who owns the computer, concerning user information about who the user is who the computer is assigned to for use, and return information for returning the computer to the owner from data stored in the memory. A method for displaying information to assist with returning a computer to its owner.

7 Claims, 10 Drawing Sheets

(56) References Cited

U.S. PATENT DOCUMENTS

| | | | |
|---|---|---|---|
| 7,945,709 B2* | 5/2011 | Cain et al. | 710/15 |
| 8,062,380 B2* | 11/2011 | Stevens | 726/35 |
| 8,234,359 B2* | 7/2012 | Bestmann | 709/222 |
| 8,241,369 B2* | 8/2012 | Stevens | 726/35 |
| 8,307,055 B2* | 11/2012 | Banga | 709/222 |
| 8,332,953 B2* | 12/2012 | Lemieux et al. | 726/26 |
| 8,346,234 B2* | 1/2013 | Banga et al. | 455/418 |
| 8,362,901 B2* | 1/2013 | Jung et al. | 340/568.1 |
| 8,418,226 B2* | 4/2013 | Gardner | 726/3 |
| 8,419,806 B2* | 4/2013 | Chase | 726/35 |
| 8,441,348 B2* | 5/2013 | Loveland | 340/539.13 |
| 8,510,825 B2* | 8/2013 | Tarkhanyan et al. | 726/16 |
| 8,528,105 B1* | 9/2013 | Miller | 726/28 |
| 8,601,606 B2* | 12/2013 | Hafeman | 726/34 |
| 8,721,738 B1* | 5/2014 | Miller | 726/35 |

OTHER PUBLICATIONS

Crouch, "Tips for keeping a leash on your PDA's data", Feb. 9, 2001, Network World, Dialog text search, p. 1-3.*

* cited by examiner

| Workstation Locked |
|---|

[Picture]
Red Stop
Sign w/white
word STOP

The Retriever by WorldsecurityCorp.com

The workstation has been locked. This equipment is protected against theft by the World Security Corp. International Registration and Recovery System. The Retriever Program has been installed to help stop theft, protect information and recover lost or stolen equipment.

To Indentify Rightful Owner & Avoid Prosecution CALL NOW :

[Recovery Name/(input from database / required)]
[Organization Name / ABC Corp/ input/ not required]
[Address 1 / input from database / not required]
[Address 2 / input from database / not required]
[City] [State] [Zip / all of these input from database / not required
[Phone 1 / input from database / required][Phone 2 / not required]
[Email / input from database / required][Fax / not required]
OR VISIT

[Picture]
Retriever Logo www.worldsecuritycorp.com/lostandfound.html
Email : lostandfound@worldsecuritycorp.com
Phone : 1-800-xxx-xxxx Registration # : xxxxxxxxxxxxxxxx (sequential number unique to each software license User :     [ _____ ]

Password : [ _____ ]

[OK]
(moves user to operating system with correct password)

[SHUTDOWN]
(initiates operating system shutdown)

*FIG.2*

| Workstation Locked | |
|---|---|
| [Picture]<br>Red Stop<br>Sign w/white<br>word STOP | The Retriever by WorldsecurityCorp.com<br><br>The workstation has been locked. This equipment is protected against theft by the World Security Corp. International Registration and Recovery System. The Retriever Program has been installed to help stop theft, protect information and recover lost or stolen equipment.<br><br>To Indentify Rightful Owner & Avoid Prosecution CALL NOW :<br><br>[Recovery Name/(input from database / required)]<br>[Organization Name / ABC Corp/ input/ not required]<br>[Address 1 / input from database / not required]<br>[Address 2 / input from database / not required]<br>[City] [State] [Zip / all of these input from database / not required<br>[Phone 1 / input from database / required][Phone 2 / not required]<br>[Email / input from database / required][Fax / not required]<br>OR VISIT |
| [Picture]<br>Retriever Logo | www.worldsecuritycorp.com/lostandfound.html<br>Email : lostandfound@worldsecuritycorp.com<br>Phone : 1-800-xxx-xxxx<br><br>Registration # : xxxxxxxxxxxxxxx |
| PRESS<br>   [OK]              [CANCEL]              [SHUTDOWN] | |

*FIG.6*

The Retriever Owner Administration

Last login: Date, Time, Time Zone/ex. Oct 27, 2003 14:41 MST
Customer# : Appears and is protected/ex. 54658653

[Log-Off]

Logo

Select Registration # for global or single update : [?]

Select Scroll

```
Edit All/Global Edit----------0
100012345--Assigned To---Dept---0
100012346--Assigned To---Dept---0
```

[Edit Record]
[Cancel]
[Update/Save]
[Clear All Fields]

OR select the [Browse List View] button to see entire list.

Reported
[Report Lost/Stolen]  [X]
[Report Equip Sold]   [X]
[Export Record]
[Report All]

Selected Registration # Displayed

Assigned to Display Recovery Info

Assigned To    : [____]
Department :   [____]
Phone      :   [____]
Email      :   [____]

Owner Display Recovery Info

Property of    : [____]
Owner Contact: [____] *
Owner Phone  : [____] *
Owner Email  : [____] *

* Required

[CHANGE OWNER PASSWORD]   [CHANGE/CLEAR "ASSIGNED TO" PASSWORD]

FIG. 8

The Retriever "Assigned To" Administration

Assigned TO : Appears and is protected / ex. Sam Stoneworth
Department : Appears and is protected / ex. Harvard Law Dept

[Log-Off]

[Edit Record]
[Cancel]
[Update/Save]

Assigned to Display Recovery Info

Phone : _____
Email : _____

[CHANGE ASSIGNED TO PASSWORD]

Screensaver Automatic
Log Off Time: ? [____] seconds

Logo www.worldsecuritycorp.com (add to the bottom of every page)

*FIG. 9*

```
                                                    Windows Logon

The RETRIEVER from World Security Corp
[Stop Sign]   Enter a valid user name and password to log on this system.

Sign On    Name : [      ]        Password : [      ]

PRESS :      OK              CANCEL          SHUTDOWN
              Correct PW
              Incorrect PW
```

This equipment is protected against theft by the World Security Corp International Registration and Recovery System. The Retriever Program has been installed to help stop theft, protect information and recover lost or stolen equipment.
To Identify Rightful Owner, Collect Reward & Avoid Prosecution CALL NOW :

```
   Owner Info:   Property of ABC Corporation
                 Bill Smith, Security Dept
                 800-222-1234                              [AD SPACE]
                 itadmin@abccorp.com Assigned To:  Carrie Hafeman
                 303-670-8800
Distributed by   lightguardian@msn.com                     [AD SPACE]

[AD SPACE]      OR VISIT

Web Site :   www.worldsecuritycorp.com/lostandfound/html
                 Emai :       lostandfound@worldsecuritycorp.com
                 Phone :      1-800-xxx-xxxx
The Retriever
                 Registration # : xxxxxxxxxxxxxxxxxxxxx
```

*FIG.10*

| Workstation Locked |

The RETRIEVER from World Security Corp

[Stop Sign]   Enter a valid user name and password to log on this system.

Sign On   Name: [____]   Password: [____]

PRESS :   | OK |   | CANCEL |   | SHUTDOWN |
Correct PW
Incorrect PW

---

This equipment is protected against theft by the World Security Corp International Registration and Recovery System. The Retriever Program has been installed to help stop theft, protect information and recover lost or stolen equipment.
To Identify Rightful Owner, Collect Reward & Avoid Prosecution CALL NOW :

Owner Info:   Property of ABC Corporation
Bill Smith, Security Dept
800-222-1234
itadmin@abccorp.com

| AD SPACE |

Assigned To:   Carrie Hafeman
303-670-8800
lightguardian@msn.com

| AD SPACE |

Distributed by

| AD SPACE |

OR VISIT

Web Site :   www.worldsecuritycorp.com/lostandfound/html
Emai :   lostandfound@worldsecuritycorp.com
Phone :   1-800-xxx-xxxx The Retriever Registration # :   xxxxxxxxxxxxxxxxxxxxx

*FIG.11*

COMPUTER RECOVERY OR RETURN

CROSS-REFERENCE TO RELATED APPLICATIONS

This is a continuation of U.S. patent application Ser. No. 10/945,332 filed Sep. 20, 2004, now U.S. Pat. No. 8,601,606, which is a continuation-in-part of U.S. patent application Ser. No. 10/304,827 filed Nov. 25, 2002, which is now abandoned, all of which are incorporated by reference herein.

FIELD OF THE INVENTION

The present invention is related to the return of lost or stolen computers. More specifically, the present invention is related to the return of lost or stolen computers using a recovery screen that appears during or after boot-up of the computer.

BACKGROUND OF THE INVENTION

Current methods of computer return or recovery products include:
(1) Physical labels that attach to the outside hardware of the computer equipment.
These hardware labels can contain custom recovery information, but because they are hardware based, they can not be interactively changed by the owner. Also, since they do not have any ability to affect the computer boot-up process, they can do nothing to help protect the confidential owner information on the hard drive. An example of a well known physical hardware/recovery label is the STOP Tag by Security Tracking of Office Property in Connecticut. This labeling system has been patented in France, the US, and other countries. The product can be easily defeated by removing the physical label. In the case of STOP Tag which includes a 'recovery mark' which states "STOLEN PROPERTY" underneath the label, a new label can be simply added over the 'recovery mark' to hide the STOLEN PROPERTY sign. (The Security Tracking of Office Property equipment recovery patent is U.S. Pat. No. 5,163,711 This patent actually refers to how the labels adhere to the equipment—but this is their patent).
The computer security recovery/return program of the present invention utilizes this type of hardware recovery approach to a small degree, but is greatly different from this system, because this is a software program rather than a hardware solution. Additionally, the present invention is greatly superior, since the owner can interactively customize the return/recovery information displayed at any time, and the present invention also helps protect the important, confidential owner information on the hard drive, by the positioning of the program layer in the equipment boot-up process.
(2) Computer Software Programs that attempt recovery through the use of the modem.
There are several patented computer security software products on the market today that are designed for the purpose of recovering lost or stolen equipment. These programs use the computer's modem to regularly call a recovery center. Then once a computer is stolen, the recovery center waits for the stolen computer to call in. When the computer modem calls in, the recovery centers use something similar to the reverse 911 system to get the phone number that the stolen equipment is accessing. Using the phone number, the recovery system then can try to get a map of where the computer is. Some of these computer security recovery programs can also attempt to locate stolen computers through an IP address. Some of these computer security recovery software programs, can actually attempt to seize the communication between the stolen computer and the recovery center and delete selected files to help protect the owner's confidential information. Products like these include CompuTrace, PC Phone Home, CyberAngel, LapTrak and Luceria.
The present invention is also designed for the purpose of recovering lost or stolen equipment, but the method is distinctively different and unique from the current methods. The present invention does not rely on the use of the computer modem. The present invention uses a layered program in the boot-up process to provide a display of the proper owner recovery and return information using the computer's own monitor or screen. The present invention is also different and superior to the above software tracking products, in helping to accomplish international recovery. None of the above products to date have been able to use the modem phone or IP system to track stolen equipment internationally. The present invention provides international recovery by displaying owner email information as well as providing recovery help through an international recovery internet web site.
There are other differences as well in how these programs try to also protect the information on the hard drive. The present invention automatically initiates during the boot-up process of the equipment, in order to display the recovery/return information before a security prompt screen to always help protect the owner's confidential information on the hard drive. Some of the programs above do nothing to protect the user information. Others like LapTrak include a Hide-A-File feature that an owner can access after the user enters the operating system. CyberAngel includes an encryption feature. Luceria includes the ability to delete pre-selected files from the recovery center. By layering this computer security application strategically before or during a security prompt in the boot-up process, this application provides a unique and different method to help protect owner information.
(An example of patents for these types of products would be the CompuTrace U.S. Pat. Nos. 5,715,174, 5,764,892, and 5,802,280).
(3) Bios Based Password Identification systems.
There are some computers that are sold with Bios based identification systems included. These products activate immediately when a computer is turned on, and prompt the user for a password before accessing the data on the computer.
The present invention is very different and unique from the Bios based program, for many reasons. Most importantly the bios based password identification products are built into the hardware of the computer equipment—not the hard drive. In other words, if you removed the hard drive from a stolen or lost laptop, and inserted the stolen hard drive into a different laptop, you would bypass the bios based password identification system, and the bios based password identification system would remain with the original equipment. Thus, the Bios Based Password Identification system can identify the computer hardware, but not the hard drive (the most important part of the computer equipment).

In addition, the Bios Based Password Identification systems are designed as a unique method for providing an additional layer of password protection to the equipment hardware, but are not designed for recovery or return. There is no design for including complete owner information, no recovery information displayed, no effective protection of the information on the hard drive, no effective method for the recovery or return of the hard drive—the most important item that a consumer would want back. In fact the Bios Password Identification product occurs before allowing the hard drive to boot up. The present invention is unique because it is an application software program that provides its layer of protection during the boot-up process (not before), and thus allows the security product to move with the hard drive, the most critical part of the computer.

SUMMARY OF THE INVENTION

The present invention pertains to a computer return apparatus. The apparatus comprises a processor. The apparatus comprises a memory connected to the processor. The apparatus comprises a display. The apparatus comprises a return screen that the processor automatically causes to appear during or after boot-up of the processor on the display, that displays ownership information concerning who owns the computer and return information for returning the computer to the owner from data stored in the memory.

The present invention pertains to a method for returning a computer to its owner. The method comprises the steps of activating a computer. Then there is the step of displaying automatically a return screen on a display of the computer during or after boot-up of the computer, which displays information concerning owner information about who owns the computer and return information for returning the computer to the owner from data stored in the memory of the computer.

The present invention pertains to a computer readable medium whose contents cause a computer to show who is its owner by performing the steps of activating a computer. Then there is the step of displaying automatically a return screen on a display of the computer during or after boot-up of the computer, which displays information concerning owner information about who owns the computer and return information for returning the computer to the owner from data stored in the memory of the computer.

The present invention pertains to a computer return apparatus. The apparatus comprises a processor. The apparatus comprises a memory connected to the processor. The apparatus comprises a display. The apparatus comprises a return screen that the processor automatically causes to appear during or after boot-up of the processor on the display, that displays information concerning an owner who owns the computer, concerning user information about who the user is who the computer is assigned to for use, and return information for returning the computer to the owner from data stored in the memory.

The present invention pertains to a method for displaying information to assist with returning a computer to its owner. The method comprises the steps of activating a computer. There is the step of displaying automatically a return screen on a display of the computer during or after boot-up which displays information concerning owner information about who owns the computer, concerning user information about who the user is who the computer is assigned to for use, and return information for returning the computer to the owner from data stored in a memory of the computer.

BRIEF DESCRIPTION OF THE DRAWINGS

In the accompanying drawings, the preferred embodiment of the invention and preferred methods of practicing the invention are illustrated in which:

FIG. 2 is a representation of a return/recovery dialog box of an embodiment of the present invention.

FIG. 6 is a representation of a return screen of the present invention.

FIG. 8 is a return administration screen of the present invention.

FIG. 9 is a second return administration screen of the present invention.

FIG. 10 is a third return administration screen of the present invention.

FIG. 11 is a fourth return administration screen of the present invention.

DETAILED DESCRIPTION

Figure 1:
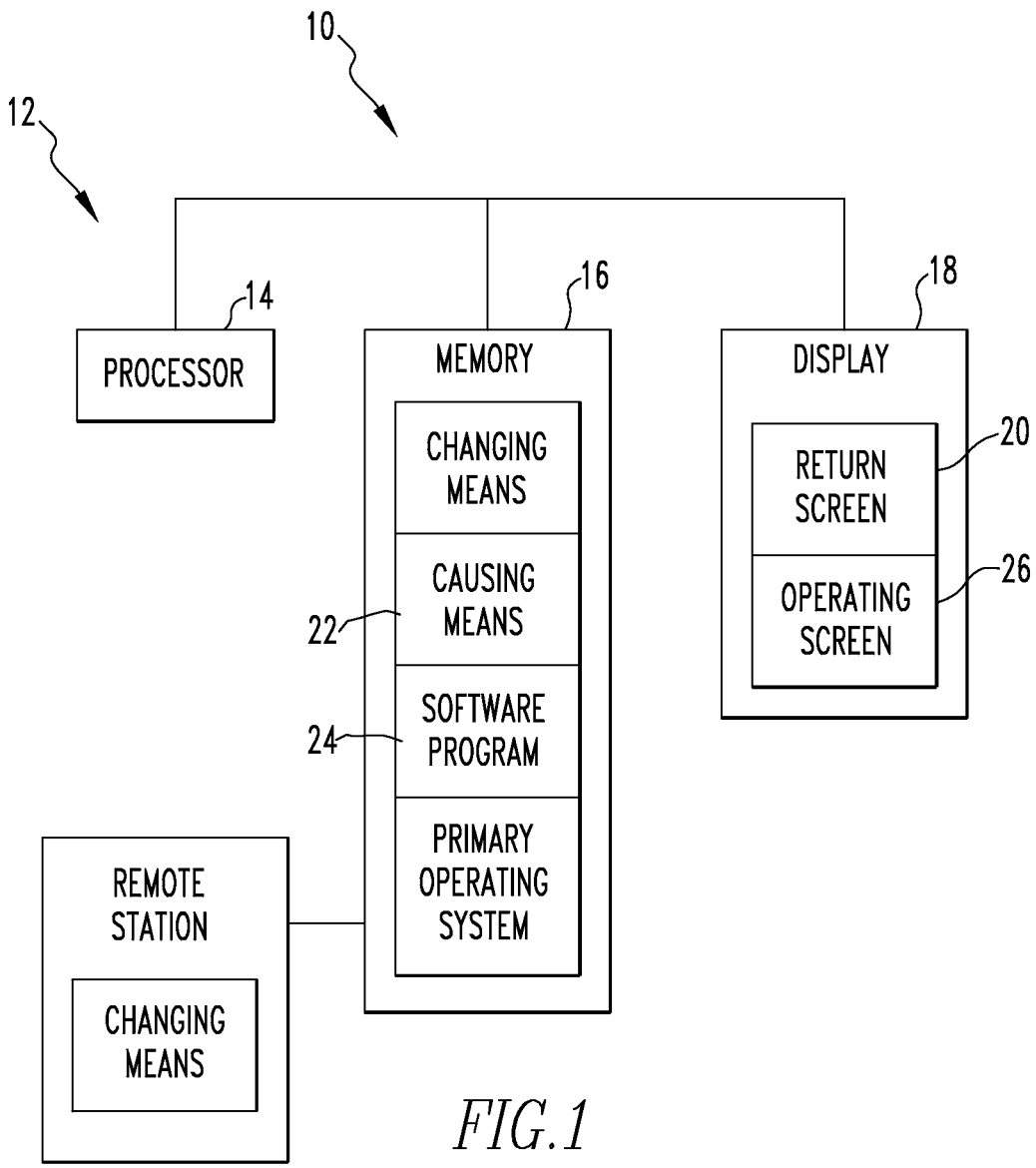
FIG. 1 is a schematic representation of the apparatus of the present invention.

Referring now to the drawings wherein like reference numerals refer to similar or identical parts throughout the several views, and more specifically to FIG. 1 thereof, there is shown a computer 12 return apparatus 10. The apparatus 10 comprises a processor 14. The apparatus 10 comprises a memory 16 connected to the processor 14. The apparatus 10 comprises a display 18. The apparatus 10 comprises a return screen 20 that the processor 14 automatically causes to appear during or after boot-up of the processor 14 on the display 18, that displays ownership information concerning who owns the computer 12 and return information for returning the computer 12 to the owner from data stored in the memory 16. The Owner is defined as the person or entity that owns, rents, or licenses the Retriever, and/or the person or entity who controls the recovery service. The Owner has greater control over the computer 12 than the user. This could include, but not be limited to, an employee of a company that owns the computer 12, or an agent of the owner or a friend that has the permission of the owner to use or have or recover the computer 12.

Preferably, the apparatus 10 includes means for causing the screen to appear on the display 18 with the owner and return information. The causing means 22 is stored in the memory 16. The causing means 22 preferably is a software program 24. Preferably, the memory 16 includes a primary operating system having an operating screen 26 for the computer 12, and the return screen 20 appears on the display 18 before the operating screen 26 of the operating system appears on the display 18.

The software program 24 preferably appears before a security prompt such as a password to be entered to obtain access to the primary operating system of the computer 12. Preferably, the software program 24 allows the owner to change the return information and the owner information, after the password or security prompt is satisfied for the computer 12. The software program 24 is preferably able to communicate through a modem (or wireless) to a predetermined location to transfer the return information to the location to facilitate return of the computer 12 if it becomes lost by the owner.

The present invention pertains to a method for returning a computer 12 to its owner. The method comprises the steps of activating a computer 12. Then there is the step of displaying automatically a return screen 20 on a display 18 of the computer 12 during or after boot-up of the computer 12, which displays information concerning owner information about who owns the computer 12 and return information for returning the computer 12 to the owner from data stored in the memory 16 of the computer 12.

Preferably, the displaying step includes the step of displaying automatically the return screen 20 before an operating screen 26 of the primary operating system of the computer 12. There is preferably the step of displaying the return screen 20 before satisfying a security prompt such as entering a password into the computer 12 to access the primary operating system. Preferably, there is the step of changing the return information, and the owner information after the step of satisfying a security prompt such as entering the password into the computer 12.

The present invention pertains to a computer 12 readable medium whose contents cause a computer 12 to show who is its owner by performing the steps of activating a computer 12. Then there is the step of displaying automatically a return screen 20 on a display 18 of the computer 12 during or after boot-up of the computer 12, which displays information concerning owner information about who owns the computer 12 and return information for returning the computer 12 to the owner from data stored in the memory 16 of the computer 12.

Preferably, the displaying step includes the step of displaying automatically the return screen 20 before an operating screen 26 of the primary operating system of the computer 12. There is preferably the step of displaying the return screen 20 before satisfying a security prompt such as entering a password into the computer 12 to access the primary operating system. Preferably, there is the step of changing the return information and the owner information after the step of satisfying a security prompt such as entering a password into the computer 12.

In the operation of the invention, first, the owner of the computer 12 would install the computer 12 security recovery/return software program 24 application. The program could be installed to work on any type of computer 12 screen including but not limited to, PC's, laptops, handheld computers (such as blackberries, palm pilots), UPS computerized handheld tracking display units, and even cell phone displays. The unique recovery/return computer 12 security program could in fact, be installed and used by any type of computer 12 that utilized a monitor display screen. The software application program provides an additional layer to the existing operating system of each computer 12. The coding language used for the software program 24 could and would vary depending upon the computer 12 equipment, but the core structure of how the program operates would be similar in all items.

Once the computer 12 security software program 24 is installed, the monitor of the computer 12 will display the complete and current recovery/return information that the program has allowed the owner of the equipment to interactively enter, change and update at anytime.

This "on the fly" ability to change owner recovery information to aid return of equipment is an important feature for anyone, including college students who travel from home to college during different parts of the year, people who move, and particularly business people who travel throughout the world. The recovery/return information would not only allow the display 18 of physical address return information, and owner contact telephone information, but would also provide for international internet based recovery through the added display 18 of owner email information, as well as the ability to display an international recovery center web site.

In addition to increasing chances of return and recovery of the stolen or lost equipment by using the computer's 12 display 18 monitor, the program is an additional programming layer added into the initial start up program of the computer 12, so that the recovery/return display 18 information occurs during or before a password or security prompt screen. This is an important feature that helps create an environment whereby the individual that happens upon a stolen or lost piece of equipment will see the owner recovery/return information displayed before a password or security prompt screen. By automatically initiating this program during or before a user's security prompt, such as a password screen program, the recovery/return program will not only increase chances of recovery, but will also increase chances that the computer 12 information on the hard drive is protected while the computer 12 is not in the owner's possession.

For example, the actual step by step operation of the program is as follows:

(1) Someone finds a lost or stolen computer 12. The person who finds the computer 12, turns the computer 12 on.
   (The software program 24 could be provided with a warning sticker that will be placed on the outside of the equipment telling anyone finding the equipment, about the program and the display recovery screen.)

(2) The computer 12 display 18 screen turns on. The computer 12 security software return/recovery program automatically initiates during the computer's 12 boot-up process.

(3) As the computer 12 booting up process moves the user to a password or security prompt screen, the computer 12 security software program 24 displays a dialog box which includes owner recovery and return information, so that the person finding the equipment can return the equipment either directly or through the international web site recovery center. The information screen can include any of the following items of information that the owner would like displayed including but not limited to: contact name, organization name, owner address, owner telephone number, owner email, international web site recovery site, international recovery email information, unique program serial/registration number. (See FIG. 2).

Virtually all of this information would have been interactively inputted by the owner, and the owner would have control over how much recovery information is displayed. (This is important, because some owners would like all the available information displayed, and others would not. For example, a U.S. secret service agent, accountant, or military personnel, might only want his name and phone number displayed, and would not like the organization name displayed for fear that would encourage a thief to try harder to break into the system rather than return the equipment.)

(4) The individual who has found the lost or stolen computer 12, is now able to easily return the equipment to the rightful owner. Because the display 18 screen showing the owner information is before, or during a password or security prompt screen that occurs before allowing the user to access the full operating system, the person recovering the equipment is blocked by the password or security prompt screen from accessing the data, and is unable to avoid seeing the recovery information screen.

Figure 3:
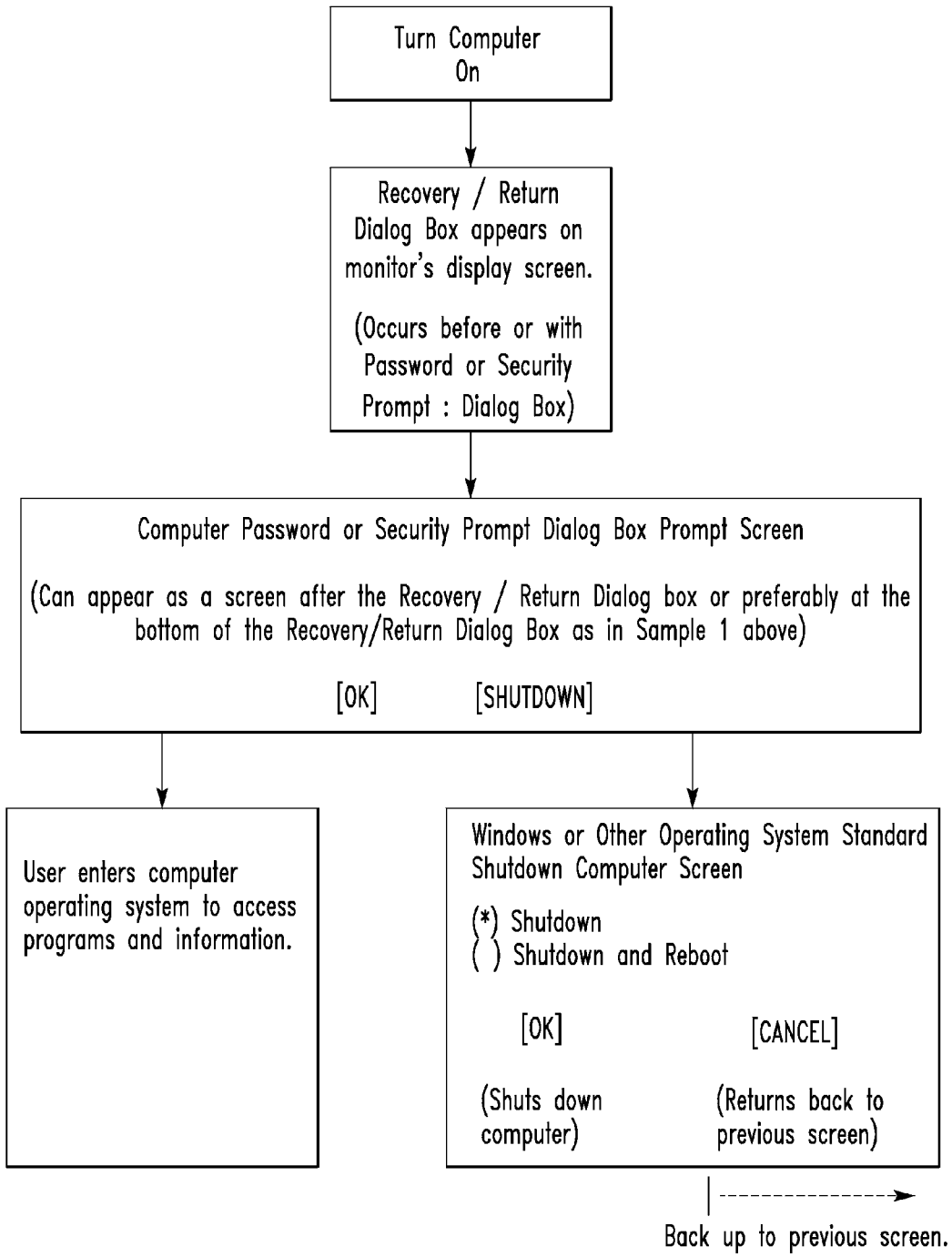
FIG. 3 is a flow chart regarding an embodiment of the present invention.

It is important to note only that the computer 12 security software recovery/return program be displayed on the computer 12 screen monitor before, or during a password or security prompt display screen, because the operating system password screen creates a 'wall' before taking the computer 12 user to the computer 12 operating system. (See FIG. 3). This helps not only protect the owner's information on the hard drive, but also ensures that the person finding the equipment will see the owner recovery/return information. If the program initiated after the password or security prompt screen, the person finding the lost or stolen equipment would have difficulty ever seeing the recovery/return display 20.

Figure 4:
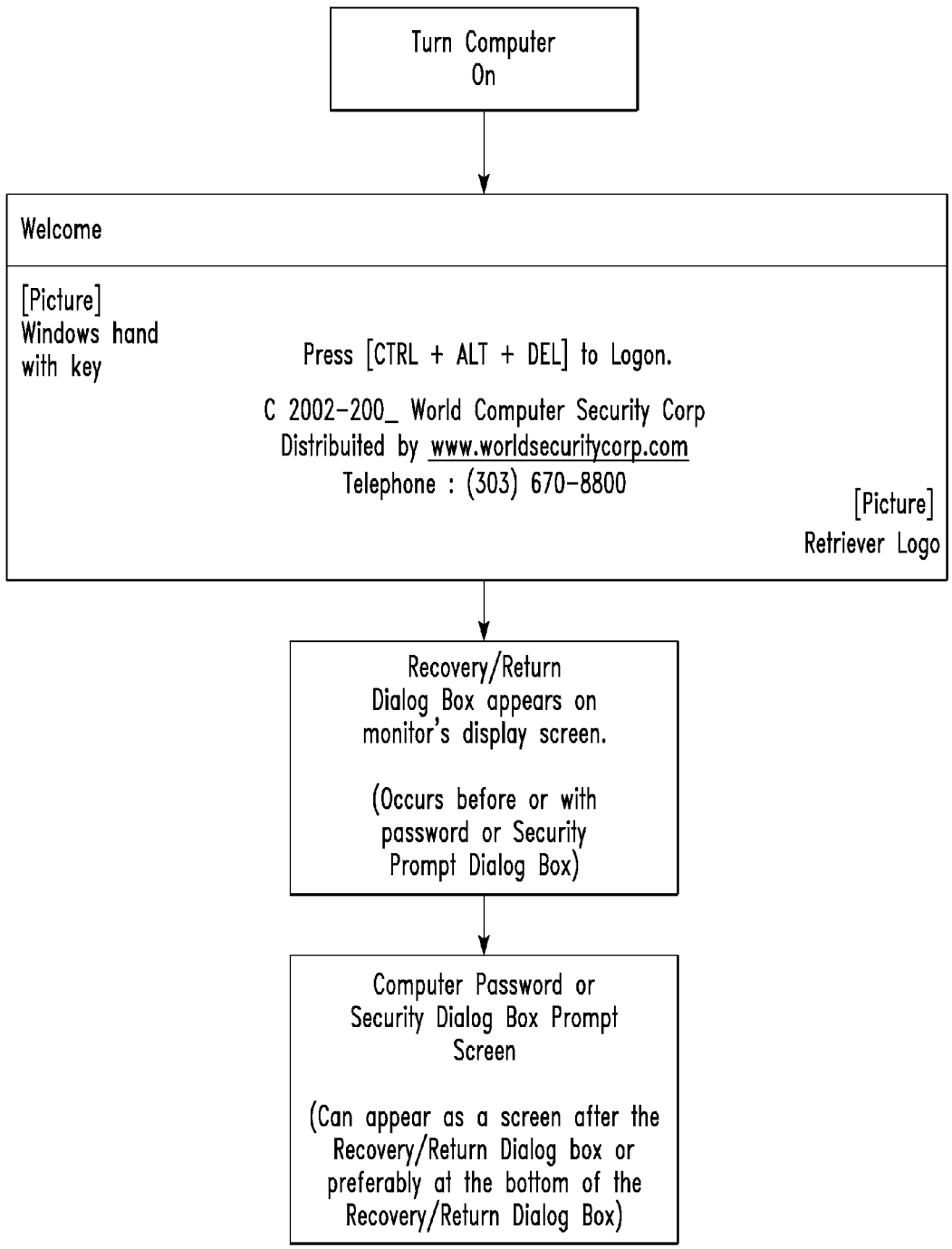
FIG. 4 is a flow chart regarding a second embodiment of the present invention.

It is also important to note that even through the recovery screen dialog box would ideally be the first screen, this may not be possible due to the wide variety of software operating systems used by computer 12 systems. Each computer 12 security program will attempt to display the recovery information on the initial screen when possible. However, for one of the Window operating systems for example, the first boot-up default screen is a CTR+ALT+DEL screen, and then the program can move to a password screen. In this case, the recovery/return program could provide a display 18 dialog screen that would be an additional layer between the CTR+ALT+DEL dialog box and the password dialog box. (See FIG. 4). Other operating systems could allow the program to display the recovery dialog box, with the password or security prompt at the bottom of the dialog box (so that even though the recovery dialog application is an additional layer during the boot-up, it would appear that the password or security prompt is included within the same dialog box). (See FIGS. 2 and 3). The recovery dialog box would occur before or during the password or security dialog box that 'blocks' the user from accessing the operating system.

Figure 5:
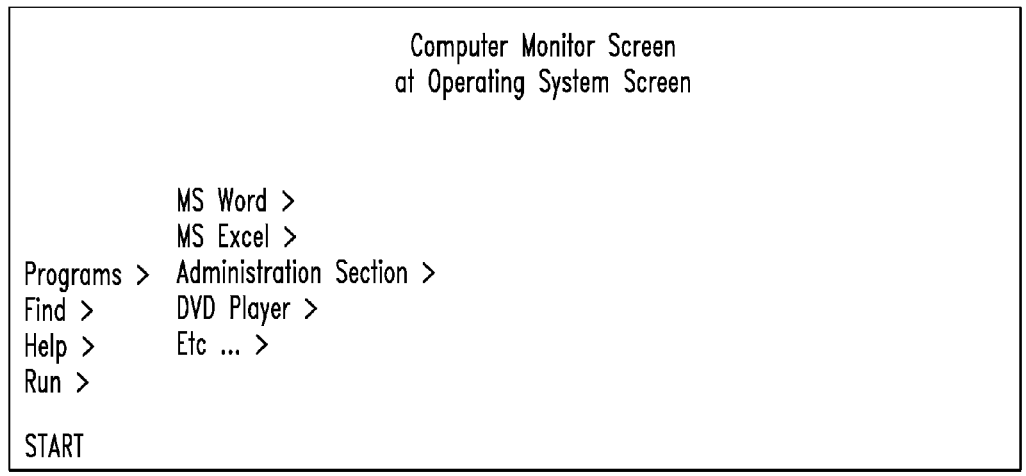
FIG. 5 is a representation of an administration program section of the present invention.
Figure 7:
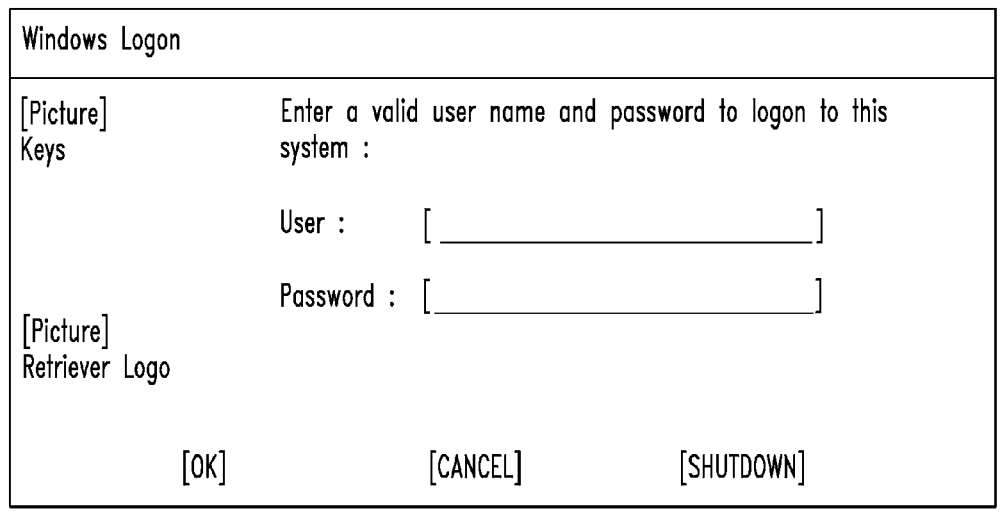
FIG. 7 is an example of a password screen utilized by the present invention.

Operation Administration Feature:

The computer 12 security software recovery/return program would also include an administration section to the program through hard drive or remote. The operation of the administration section features could work like this:

(1) The owner of the computer 12 would turn their machine on.
(2) As the boot-up begins, the owner sees the recovery/return display 18 dialog box appear.
(3) The owner then may see a password or security prompt to allow the owner into the operating system.
(4) In the event that there is a security prompt, the owner types in the correct password or satisfies the security prompt to access the hard drive's operating system and programs.
(5) Once the owner gains access to the primary operating system, the owner will have the ability to select an administration section for the computer 12 security software recovery/return program through the Start Up button or a shortcut icon on the display 18 screen. (See FIG. 5). The administration dialog box will allow the owner to interactively change the recovery/return display 18 information that appears in the recovery/return dialog box displayed during the boot-up process.

(6) There are additional features to the administration dialog box that may be added. Some of the features include:
  a) added password or security protection prompt to allow the owner to access the administrative part of the program in order to change the recovery/return dialog display information,
  b) interactive email based registration capability that would export owner information to an international recovery center using the interne,
  c) a 'where to order more licenses' information screen (that could be tailored to allow dealer/distributor contact information),
  d) screen saver lock feature, and
  e) possible audit log to track user activity.

There are at least 3 important features that are critical and unique to the program, and make this program vastly different from other equipment security recovery products:

(1) The ability to display recovery/return information on the computer's 12 monitor screen.
(2) The ability to make sure that the display 18 occurs before or during a password or security prompt stopping the user from accessing the full operating system and hard drive information.
(3) The ability using an administrative program feature to allow the owner to interactively change the recovery/return information at any time.

Installation of the program is simple. The owner would load an installation CD into the computer 12 equipment or download the program from the interne. During the installation process, the owner will be prompted to provide some recovery/return information that the owner would like displayed; for example, contact name, phone and email information. The installation process will create the recovery/return display 18 screen, input the owner information, and create an administration section that can be accessed by the owner to be able to change recovery information at any time. After installation is complete, the computer 12 will be rebooted, and the program installation will be complete.

The program is essentially a recovery/return information screen that is displayed, and does not attempt to duplicate or replace more sophisticated access security programs already on the system. In the event that there is a security access program on the system using a password, security card, or biometric recognition device, the recovery/return screen 20 is ideally layered before the security screen (otherwise the recovery/return information would never be displayed except to the owner since the person finding the equipment would not be able to enter the correct security information to get to the return screen 20). In operation:

1) The equipment is turned on.
2) The equipment processor 14 begins to go through the steps necessary to open up and allow access to the equipment's operating system. These steps may involve displaying various visual screens, depending upon the equipment.
  a) For example, a typical Gateway computer may have the following series of displays:

| Ideal Return Dialog Display Spots | | | | At minimum needs to display before Operating System and should appear before security prompt. | |
|---|---|---|---|---|---|
| Monitor self-test display | Gateway & Gateway logo display | Copyright Promise Technology display | MS Windows 98 Logo display | Microsoft Password Security Prompt | Main/Primary Operating System where user can begin using equip. & programs |

In this example, the recovery/return program would display before or with the Microsoft password or security prompt.

b) Another example is with a Dell computer, which may have the following series of displays:

| Ideal Return Dialog Display Spots | | | | At minimum needs to display before Operating System and should appear before security prompt. | | |
|---|---|---|---|---|---|---|
| Dell Name and Logo display | MS Windows 98 Logo display | Copyright ESS Technology display | MS Ctr + Alt + Del Logon display | Security Program that uses a Windows password and a physical access card | Network Prompts if not connected | Main Operating System where user can begin using equip. & programs | c) Another example is with an AT&T Cellular phone, which may have the following series of displays:

| Ideal Display Spots for Return Display Program using OK prompt | | At minimum needs to display before operating system |
|---|---|---|
| AT&T Name & Logo display | Display showing phone number | Main/Primary Operating System where user can begin using equip. & programs |

3) The Return/Recovery owner information display screen is displayed before the main operating system. The Return/Recovery owner information screen has been customized by the owner (and can be interactively changed using an administrative program that can be accessed when the user gets to the operating system).

4) Once the owner information dialog box is displayed, it remains displayed until the user satisfies a security prompt and/or pushes an OK button or says "OK". The security program prompt could include a password that might need to be entered, a card access card that might need to be used, or a biometric impression that might need to be used, such as fingerprint, face, eye, or voice recognition system. Once the security program is satisfied, the computer 12 program continues to the main operating system.

The definition of the "boot-up" process includes a series of steps that the computer 12 is taking (including the series of displays that the programs are automatically displaying) in order to move the user to gaining access to the main operating system. And, as can be seen from the 3 examples above, the booting up process entails different steps and different display 18 screens on its way to the operating system.

It is important that 1) the Recovery/Return screen 20 be displayed before the operating system, and 2) that the display remains displayed until the user does something (like pushes an OK button on the screen, or says OK for future voice activation programs, or satisfies a security prompt).

This software application:
should be layered before the main operating system, and in the event that a security program exists, should be layered before or during the security program prompt (otherwise the recovery screen would only be seen by the authorized owner).

Security programs that currently exist could include:
a) entering a correct password (in the example of the current computers that have a Microsoft password system already built in and available).
b) entering another type of security prompt such as future security applications with a voice activated security prompt, an access card which needs to be within the vicinity of the computer 12, or even a fingerprint or eye recognition security program (which are currently available).

The basic Recovery/Return computer 12 security software program 24 may or may not include a security prompt feature as an option. The point of the program is that the recovery information can be customized, interactively changed, and displayed using the computer's 12 screen, and layered at the correct point (before the operating system, and before or during a security program prompt if a security program exists).

The present invention pertains to a computer 12 return apparatus 10, as shown in FIG. 1. The apparatus 10 comprises a processor 14. The apparatus 10 comprises a memory 16 connected to the processor 14. The apparatus 10 comprises a display 18. The apparatus 10 comprises a return screen 20 that the processor 14 automatically causes to appear during or after boot-up of the processor 14 on the display 18, that displays information concerning an owner who owns the computer, concerning user information about who the user is who the computer 12 is assigned to for use, and return information for returning the computer 12 to the owner from data stored in the memory 16.

Preferably, the apparatus 10 includes means 22 for causing the screen to appear on the display 18 with the owner, user and return information. The causing means 22 is stored in the memory 16. The apparatus 10 preferably includes means for changing the return information by the user through remote communication with the computer 12. Preferably, the changing means changes a security prompt by the owner, overriding any security prompt entered into the computer 12 by the user. The apparatus 10 preferably includes means for changing recovery information of additional computers 12 owned by the owner through remote communication by the owner with the additional computers 12.

The present invention pertains to a method for displaying information to assist with returning a computer 12 to its owner. The method comprises the steps of activating a computer 12. There is the step of displaying automatically a return screen 20 on a display 18 of the computer 12 during or after boot-up which displays information concerning owner information about who owns the computer 12, concerning user information about who the user is who the computer 12 is assigned to for use, and return information for returning the computer 12 to the owner from data stored in a memory 16 of the computer 12.

Preferably, the displaying step includes the step of changing the return information by the user. The changing step preferably includes the step of changing the return information by the user through remote communication with the computer 12. Preferably, there is the step of changing a security prompt by the owner, overriding any security prompt entered into the computer 12 by the user. There is preferably the step of the owner changing recovery information of additional computers 12 owned by the owner through remote communication by the owner with the additional computers 12.

The Retriever is preferably a software program 24 that is disposed in a memory 16 of a computer 12 and at a remote station to allow an owner to communicate and control the computer 12, as needed.

The Retriever clearly distinguishes between the "Owner" of the equipment and the person(s) "Assigned To" the equipment. See FIGS. 9 and 10.

The Owner is defined as the person or entity that owns, rents, or licenses the Retriever, and/or the person or entity who controls the recovery service. The Owner has greater control over the computer 12 than the user.

The Retriever allows the ability to distinguish between the 'owner' and the 'assigned to' person who may be allowed possession of the equipment. These two entities can be the same, but very often are not. For example, a bank may be the owner of 5,000 laptops, and then issue them out to 5,000 different employees. The Bank owns the laptops, and the employees are the "assigned to" persons. Another example would be a company that may provide a recovery security service to equipment owners, and would also be able to control the recovery screen information and display through their recovery service.

The Retriever allows the 'owner' of the protected equipment to ultimately control the recovery information displayed on the protected equipment, not the user.

The current PDA recovery programs, for example, are all completely controlled by the equipment user. Again the 'owner' and 'assigned to' user of the equipment may or may not be the same people, but the Retriever is unique because it allows the ability to distinguish between the 'owner' and the 'assigned to' person. The Retriever allows the 'owner' to have control over both the 'owner' recovery information displayed AND the 'assigned to' recovery information displayed. The 'assigned to' person(s) can only change or control the 'assigned to' recovery information.

The Retriever also allows the owner ultimate control over the security prompt, not the user.

The current PDA software recovery program gives ultimate control over the security prompt to the user or 'assigned to' individual(s). The 'owner' would want the ability to reassign the equipment to a new person. The current PDA recovery program does not satisfy this need. If a disgruntled employee quits or gets fired and hands back their PDA with a unique secret password prompt and says they cannot remember the password, the current PDA recovery program makes it very difficult for the owner to be able to regain control over the password prompt and assign the equipment to someone new.

Both the pocket PC, Palm and other handhelds do have the ability to create a screen on the monitor in conjunction with a password prompt. However, the design of these current programs are flawed, as evidenced by the fact that the program feature is rarely used, even though available.

The Retriever satisfies a need that the pocket PC, Palm and other PDA recovery programs do not. It is the 'owner' of the equipment that needs to have ultimate control of (1) the program, (2) the recovery screen and (3) the password—not the person who is using the equipment. There are many reasons why this is important.

Examples. There is a school district in Virginia that issued 25,000 laptops to students at the high school and middle school level last year. The school district owns the laptops—not the students assigned to the equipment. The students are unlikely to care as much as the school district as to the loss of the equipment.

If the current PDA recovery software program 24 was loaded onto these laptops, the kids could easily (and more than likely would) disable the security prompt since it would be inconvenient to continually have to satisfy a password prompt every time the computer 12 was turned on or timed out. In addition, with the current PDA recovery system the owner of the equipment (the school district) would loose control of not only the recovery information displayed on the monitor, but the password that allows access to the equipment. The Retriever is unique since it distinguishes between the 'owner' and the 'assigned to' person, allows the owner to have ultimate control over the display 18 screen, allows the 'owner' to override recovery information displayed by the 'assigned to' person if necessary, and allows the 'owner' to have ultimate control of the password to access the equipment.

Individuals who are 'assigned to' equipment have inherently less liability and concern if the equipment is lost or stolen than 'the owner'. This is true for not only students, but employees at sales firms, banks, accounting firms, corporations, healthcare facilities, high school students, university personnel, people who rent or lease equipment, etc.

It is the 'owner' who should have ultimate control over security decisions regarding the equipment, not necessarily the person who happens to be in possession of or assigned to the equipment. The current PDA design causes an 'inconvenience' by creating an extra logon screen, and therefore, is not likely to be used by the equipment holder, especially if the equipment holder is not the owner. The owner needs the ability to control whether the program is enabled, and thus ensure that the 'assigned to' person use the program if the owner desires for them to use it.

The current PDA recovery system design is indeed flawed. With the current PDA recovery program, the user or person assigned to the equipment has complete and sole control over recovery information, complete and sole control over the security password, and complete and sole control over whether the security program is even enabled or not. These are some of the reasons that help explain why people that do have a PDA rarely use the recovery security feature available.

As further proof as to the inadequacy of this current program, is the fact that The World Computer Security Company of Colorado has sold "outside" glue on recovery labels to customers to protect hundreds of PDAs, Palms, etc. that indeed already have the PDA recovery program mentioned by the patent office. In fact, this company recently sold a couple hundred of these glue-on security STOP Tag recovery labels that were PDA size this month to Bertek Pharmaceuticals and Washington University St. Louis (June 2004). This is further proof that the current program design is flawed and not commercially viable.

Most alarmingly, the current program does not take into account that many crime statistics suggest that 90% of all theft is internal (committed by those non-owners allowed access to property)!

Perhaps one of the most important and critical differences between the Retriever and the existing programs is the type of communication possible made possible with the Retriever. The Retriever is designed to enable communication of the recovery display information back and forth from the recovery administration center to the equipment being protected to control changes to the recovery display 18 screen, and this communication from the recovery administration center is not limited to only the hard drive of the equipment being protected or the computer 12 that the equipment is synchronized with.

The recovery administration update center for the current PDA recovery program is limited to the user updating the owner information directly on the PDA, or directly on the computer 12 the PDA is set up to synchronize with when accessing the PDA program on the main computer 12. This recovery display information can then be synchronized using the PDA synchronize capability.

The Retriever's recovery administration update center can be an administration program located on the hard drive of the protected equipment, an administration program located on a server on a network and/or an administration program located on a hard drive of a computer 12 that is completely remote from the protected equipment, for example, a web based recovery center. This is an very unique and important feature.

The program design feature allows the 'owner' to access the recovery center administration program, initiate a download of changes to the protected equipment, control the entire recovery screen displayed, and even override the 'assigned to' person's input. This is an important feature, in case the 'assigned to' person is a disgruntled employee who simply reports equipment as stolen and is still using the equipment or has sold it. The Retriever program design allows the owner to make changes at the recovery center level, have the recovery center attempt to communicate those changes to the 'stolen equipment' via phone line (or cable, bluetooth, satellite etc. in the future). This allows the owner to eliminate erroneous or misleading 'assigned to' recovery information that might have been created by the rogue "assigned to" individual, replace the display 18 screen with correct owner recovery information and even change or delete the 'assigned to' password to stop access to the equipment information. By attempting to disable the 'assigned to' password from remote, the equipment becomes extremely difficult if not impossible to use, the information on the hard drive is better protected, and the chances of a quick recovery of the stolen equipment are dramatically enhanced. This remote communication ability makes the Retriever design completely unique and very different from the current PDA recovery software programs.

It is this remote communication ability in the design of the Retriever software recovery program that helps better meet the challenges of internal theft (again many statistics suggest that it is internal theft that comprises 90% of all theft). With the current PDA recovery program, the owner' is limited to only making changes directly on the 'assigned to' person's equipment and/or the 'assigned to' person's computer 12 or over a limited network that the assigned to person may never access again. With the Retriever's recovery software design, the 'owner' can also attempt to access the 'assigned to' person's equipment by additional ways, such as over the Internet, phone lines, cable, etc. thereby having a more effective ability to try to locate the equipment and control the recovery information displayed by remote.

The "assigned to" person can only control the "assigned to" recovery information and password. The "owner" can control both the owner information and all the "assigned to" recovery information at the recovery center level, and then attempt to communicate this to the protected equipment using the Retriever licensed security recovery program.

Using this unique communication power, both 'owner' and "assigned to" information can be uploaded to the recovery center and/or downloaded to the protected equipment in order to synchronize the international recovery center information and the recovery information displayed on the initial display 18 screen. (This is a combination of the PDA type of synchronization between the main computer 12 and the PDA, and the McAfee anti-virus software interne updating capability where every time you go on-line, your computer 12 automatically checks to make sure that you have the most current anti-virus software and automatically updates your computer 12 with the latest changes.) Nobody has ever before considered or designed a product combining this type of communication ability with this type of recovery security program that seizes control of the display 18 monitor until a security prompt is satisfied. The Retriever design allows an equipment recovery capability that just does not exist on today's market, and is completely unique from all current products on the market.

Current PDA Communication is limited:
User input/update PDA<--->User input/update Host Computer w/PDA program The Retriever Design Communication is much broader:

Outside communication via phone line < ---- > Protected Computer < ---- > Network Server
cable, wireless, internet etc ... user input/update    ∧    user input/update
|
|
User input/update on equip The Retriever design has both a stand-alone and a network based program. This allows an owner to handle multiple machines easily for organizations or entities with more than one equipment.

Each program license has a unique program registration license number that is unique. This is extremely important feature that allows many features that owners would need in handling the protection of multiple machines. From looking at the current PDA security recovery software, the program appears to be only to have 'single license' capability.

The Retriever program design can also allow global changes by the owner who might handle multiple computers.

This is a very important feature for organizations who are in charge of large numbers of computers. For example, let's say that Sgt. Cody is the crime prevention officer at Georgetown University and then retires. Let's say that Sgt. Grier is the contact person currently listed on 700 university owned computers. Now Sgt. Smith is in charge. The Retriever program design allows Sgt. Smith (assuming she uses the correct password), to access the recovery center and globally change all the computers that she wants to change and display her phone number and name to help with recovery. This ability to allow the owner to globally make changes to certain display information over multiple licensed computers is also extremely useful if a phone number changes, a corporate name or logo changes, a recovery contact name changes or a phone number area code changes.

The program also allows owners to easily tag or mark equipment that is ready or available to be sold making it easy for new owners to re-register under the initial security software license registration number. Let's say for example that ABC Telecommunications decided to sell 100 laptops that they are replacing with new ones. The owner or authorized person representing the owner (the IT director for example) can preset the 100 serial license numbers as for sale to allow easier sales to new owners using organizations such as Ebay. New owners can easily be allowed to re-register under the released registration number that is associated with the Retriever recovery license.

The program also allows owners to easily report equipment as stolen over the internet. Owners can go to the recovery administration center, find the license number of the equipment they believe might be lost or stolen, update the information for this specific license number and report the information over the internet for all to see. This is very helpful resource for both owners and authorities to facilitate recovery of lost or stolen items.

The security program can also not only display 'owner' and 'assigned to' information but also display organization logos and/or other pictures or designs. This is another extremely important feature. The Retriever program seizes control of the entire display 18 screen.

Many, many customers currently desire to customize their physical security tags with owner and logo information. This is often difficult, since the security label manufacturer has to get art design approval, fit corporate and logo information on an often limited space, and then set the tool to run the special labels at the manufacturing plant. Lead times can often go over 3 weeks, and once the customer has their special customized tag, they must often order a minimum amount (STOP Tag has a minimum order of 200 tags for customization for example). If the company changes names, logos or phone numbers the physical security label suddenly becomes incorrect. And, when these customized security tag customers want to sell their equipment, it becomes difficult, since the security label can permanently read 'Property of ABC Corp".

Let's say the company wants to donate 25 laptops to the church. A nun or other church personnel would not really want to be carrying around laptops where the cover of the laptops state "Property of the US Army", "Property of Waste Management Company", or "Property of XYZ University". This becomes awkward for the new owner who actually is the new rightful owner, and cannot always easily remove the existing security label.

The Retriever provides an interactive method of designing and changing the entire recovery screen 'on the fly' that eliminates all of these current problems. Organization logos or ads can be easily and quickly downloaded onto the recovery screens of protected equipment. The current PDA system does not allow this.

The Retriever creates an audit trail of changes. Time and Date fields registering changes are logged and maintained at the recovery center to provide the customer with a security audit trail of changes.

The Retriever display not only appears during the initial boot-up, but the Retriever program security recovery display screen can also be manually initiated by the computer 12 user. This would be the Workstation Locked display. (FIG. 10). This allows the computer 12 user to manually lock the computer 12 screen and protect the computer 12 if they need to leave their computer 12 for a few minutes. This feature is handy for all types of situations, like emergency room laptops at hospitals, etc.

The Retriever display not only appears during the initial boot-up or with a manual activation by the computer 12 user; the Retriever workstation locked recovery screen can also be initiated automatically using a screen saver timer feature that can be changed by the Owner or the Assigned To person. For example, let's say the computer 12 screen saver time feature has a 10 minute timer. If there is no activity on the computer 12, the Workstation Locked security Recovery screen will display and stay displayed until the password prompt is satisfied.

The owner can browse the entire database of there own licensed Retriever security software licenses. The owner can look at an individual license record, or browse the entire database and use features such as EDIT, SORT, SEARCH/FIND, and EXPORT when working with the licensed records.

The Retriever provides the owner with extra data information fields that owners can assign their own values to. These data fields are not really related to recovery information displayed, but this is a handy convenience for owners who would like to correlate their own inventory numbers to Retriever license numbers, search by lease dates on equipment, etc.

It should be noted that the communication ability is not limited to internet communication. Satellite, WI-FI, cable, bluetooth, or any other type of remote communication can be used.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for displaying information to assist with returning a computer to its owner comprising the steps of:

displaying by a processor automatically an ownership recovery screen on a display of the computer which displays information concerning return information for returning the computer to the owner from data stored in a memory of the computer, the ownership recovery screen displaying recovery information before or with a lock screen, to facilitate return of the computer and which is maintained on or with the lock screen so the return information is visible to anyone viewing the ownership recovery screen or lock screen until a security prompt is accepted by the processor, when security information associated with the security prompt is accepted by the processor allowing the user to access the computer, the ownership recovery screen or lock screen showing additional information which includes advertisements, logos, pictures, or designs;

initiating and changing recovery information by the owner or a party authorized by the owner of the computer through remote communication by the owner without assistance by the user with the computer; and initiating and changing the additional information which includes advertisements, logos, pictures, or designs, through remote communication without assistance by the user with the computer, wherein the changing of the recovery information and the additional information is done through an interactive program stored in the memory of the computer and is remotely accessed only by the owner of the computer or the party authorized by the owner to enable the designing and changing of the ownership recovery screen.

2. The method as described in claim 1 including the step of selecting by the owner or user an Internet link on the ownership recovery screen, an Internet location associated with the Internet link stored in the memory of the computer until the security prompt is accepted by the processor, when the security prompt is accepted by the processor, the owner or user is automatically able to access the computer and the Internet location associated with the Internet link.

3. The method of claim 1 when the security information associated with the security prompt is accepted by the processor allowing the user to access the computer, the ownership recovery screen having an active link allowing remote communication to a remote server which provides recovery information to facilitate return of the computer.

4. A system for displaying information at a computer owned by an owner which is used by a user, the system comprising:
  a computer comprising;
  a processor;
  a memory connected to the process;
  a display;
  a lock screen through which the computer can be locked to prevent use of the computer;
  an ownership recovery screen that the processor causes to appear automatically on the display, the ownership recovery screen displays return information for returning the computer to the owner from data stored in the memory of the computer, the ownership recovery screen displaying return information before or with the lock screen to facilitate return of the computer and which is maintained on the ownership recovery screen or the lock screen so the return information is visible to anyone viewing the ownership recovery screen or lock screen until a security prompt is accepted by the processor, when security information associated with the security prompt is accepted by the processor, allowing the user to access the computer, the ownership recovery screen or lock screen showing additional information which includes advertisements, logos, pictures, or designs; and
  a server remote from the computer for communicating with the computer for allowing the owner of the computer or a party authorized by the owner of the computer to control the screen display without assistance by the user to change the return information and the additional information to assist with returning the computer to the owner, wherein the changing of the return information and the additional information is done through an interactive program stored in the memory of the computer and is remotely accessed only by the owner of the computer or a party authorized by the owner to enable the designing and changing of the ownership recovery screen.

5. The system of claim 4 wherein the ownership recovery screen includes an internet link that can be selected by the owner or user, an Internet location associated with the Internet link stored in the memory of the computer until the security prompt is accepted by the processor, when the security prompt is accepted by the processor, the owner or user is automatically able to access the computer and the Internet location associated with the Internet link.

6. The system of claim 4 wherein the ownership recovery screen having an active link to allow remote communication to the remote server which provides recovery information to facilitate return of the computer.

7. A computer program stored in a non-transient memory for displaying information to assist with returning a computer to its owner comprising the computer generated steps of:
  displaying by a processor automatically an ownership recovery screen on a display of the computer which displays information concerning return information for returning the computer to the owner from data stored in a memory of the computer, the ownership recovery screen displaying recovery information before or with a lock screen, to facilitate return of the computer and which is maintained on or with the lock screen so the return information is visible to anyone viewing the ownership recovery screen or lock screen until a security prompt is accepted by the processor, when security information associated with the security prompt is accepted by the processor allowing the user to access the computer, the ownership recovery screen or lock screen showing additional information which includes advertisements, logos, pictures, or designs;
  initiating and changing recovery information by the owner or a party authorized by the owner of the computer through remote communication by the owner without assistance by the user with the computer; and
  initiating and changing the additional information which includes advertisements, logos, pictures, or designs, through remote communication without assistance by the user with the computer, wherein the changing of the recovery information and the additional information is done through an interactive program stored in the memory of the computer and is remotely accessed only by the owner of the computer or the party authorized by the owner to enable the designing and changing of the ownership recovery screen.

* * * * *